United States Patent

Sebastian et al.

(10) Patent No.: US 6,713,921 B2
(45) Date of Patent: Mar. 30, 2004

(54) PERMANENT MAGNET STRUCTURE FOR BRUSHLESS MOTOR AND POWER ASSIST ACTUATOR USING THE SAME

(75) Inventors: Tomy Sebastian, Saginaw, MI (US); Sunil Keshava Murthy, Austin, TX (US); Buyun Liu, Ann Arbor, MI (US); Mark F. Fleer, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 128 days.

(21) Appl. No.: 09/850,753

(22) Filed: May 8, 2001

(65) Prior Publication Data

US 2002/0167241 A1 Nov. 14, 2002

(51) Int. Cl.⁷ .................... H02K 21/12; H02K 21/00
(52) U.S. Cl. .................... 310/156.38; 310/156.01; 310/152
(58) Field of Search .................... 310/156.38, 156.01, 310/152, 40 R, 10

(56) References Cited

U.S. PATENT DOCUMENTS

| | | | | |
|---|---|---|---|---|
| 3,983,953 A | * | 10/1976 | Bayle | 180/79.1 |
| 4,415,054 A | * | 11/1983 | Drutchas | 180/79.1 |
| 4,530,413 A | * | 7/1985 | Buike et al. | 180/79.1 |
| 4,629,024 A | * | 12/1986 | Buike et al. | 180/79.1 |
| 4,642,502 A | | 2/1987 | Carpenter et al. | 310/156 |
| 4,986,381 A | * | 1/1991 | Morishita et al. | 180/79.1 |
| 5,144,735 A | * | 9/1992 | Stark | 29/732 |
| 5,220,228 A | * | 6/1993 | Sibata | 310/254 |
| 5,302,876 A | * | 4/1994 | Iwamatsu et al. | 310/156.12 |
| 5,345,129 A | * | 9/1994 | Molnar | 310/156.28 |
| 5,345,669 A | * | 9/1994 | Zigler et al. | 29/598 |
| 5,437,349 A | * | 8/1995 | Kurahashi et al. | 180/79.1 |
| 5,573,079 A | * | 11/1996 | Suda et al. | 180/444 |
| 5,773,908 A | | 6/1998 | Stephens et al. | 310/254 |
| 5,783,890 A | * | 7/1998 | Mulgrave | 310/156.43 |
| 5,898,990 A | | 5/1999 | Henry | 29/598 |
| 5,925,964 A | * | 7/1999 | Kusase et al. | 310/263 |
| 6,005,318 A | | 12/1999 | Pop, Sr. | 310/156 |
| 6,177,745 B1 | | 1/2001 | Narita et al. | 310/156 |
| 6,332,932 B1 | * | 12/2001 | Kohara et al. | 148/301 |
| 6,413,457 B1 | * | 7/2002 | Fukushima et al. | 264/109 |
| 6,460,649 B2 | * | 10/2002 | Chen et al. | 180/443 |
| 6,486,585 B1 | * | 11/2002 | Badey et al. | 310/263 |
| 6,486,658 B2 | * | 11/2002 | Naidu | 324/207.21 |
| 6,597,078 B2 | * | 7/2003 | Crapo et al. | 310/156.01 |
| 6,599,468 B2 | * | 7/2003 | Okuyama et al. | 419/66 |

* cited by examiner

*Primary Examiner*—Thomas M. Dougherty
*Assistant Examiner*—Pedro J. Cuevas
(74) *Attorney, Agent, or Firm*—Michael D. Smith

(57) ABSTRACT

A permanent magnet structure for use in brushless motors is disclosed. In an exemplary embodiment of the invention, the magnet structure includes a parallelogram shaped body. The body has an outer surface and an inner surface, with the outer surface and the inner surface being arcuate in shape.

20 Claims, 3 Drawing Sheets

PERMANENT MAGNET STRUCTURE FOR BRUSHLESS MOTOR AND POWER ASSIST ACTUATOR USING THE SAME

BACKGROUND

Polyphase permanent magnet, brushless motors driven by a sinusoidal current offer the capability of providing low torque ripple, noise and vibration in comparison with those driven by a square wave current. Theoretically, if a motor controller can produce polyphase sinusoidal currents with the same frequency as that of the sinusoidal back EMFs, the torque output of the motor will be a constant, and zero torque ripple can be achieved. However, due to practical limitations of motor design and controller implementation, there are deviations from pure sinusoidal back EMF and current waveforms. The deviations will typically result in parasitic torque ripple components at various frequencies and magnitudes.

Another component of torque ripple in a conventional permanent magnet, brushless motor is cogging torque. Cogging torque is a result of the magnetic interaction between the permanent magnets of the rotor and the slotted structure of the armature. As the leading edge of a magnet approaches an individual stator tooth, a positive torque is produced by the magnetic attraction force exerted therebetween. However, as the magnet leading edge passes and the trailing edge approaches, a negative torque is produced. The instantaneous value of the cogging torque varies with rotor position and alternates at a frequency that is proportional to the motor speed and the number of slots. The amplitude of the cogging torque is affected by certain design parameters such as slot opening/slot pitch ratio, magnet strength and air gap length.

One approach to reducing torque ripple is to employ a slotless armature, which allows for precise winding patterns in order to achieve a pure sinusoidal back EMF. In addition, the absence of slots in the armature eliminates the cogging torque resulting therefrom. However, the manufacturing process for slotless motors is not well defined and thus the manufacturing costs thereof may be prohibitive.

SUMMARY

The problems and disadvantages of the prior art are overcome and alleviated by a permanent magnet structure for use in brushless motors. In an exemplary embodiment of the invention, the magnet structure includes a parallelogram shaped body. The body has an outer surface and an inner surface, with the outer surface and the inner surface being arcuate in shape.

In a preferred embodiment, the outer surface and the inner surface are generally concentric with one another. The body is preferably comprised of neodymium-iron-boron material and is epoxy coated. In an alternative embodiment, the body is nickel-plated. In still another alternative embodiment, the body is aluminum deposition coated.

BRIEF DESCRIPTION OF THE DRAWINGS

The present invention will now be described, by way of example only, with reference to the accompanying drawings which are meant to be exemplary, not limiting, and wherein like elements are numbered alike in several Figures, in which.

DETAILED DESCRIPTION

Figure 1:
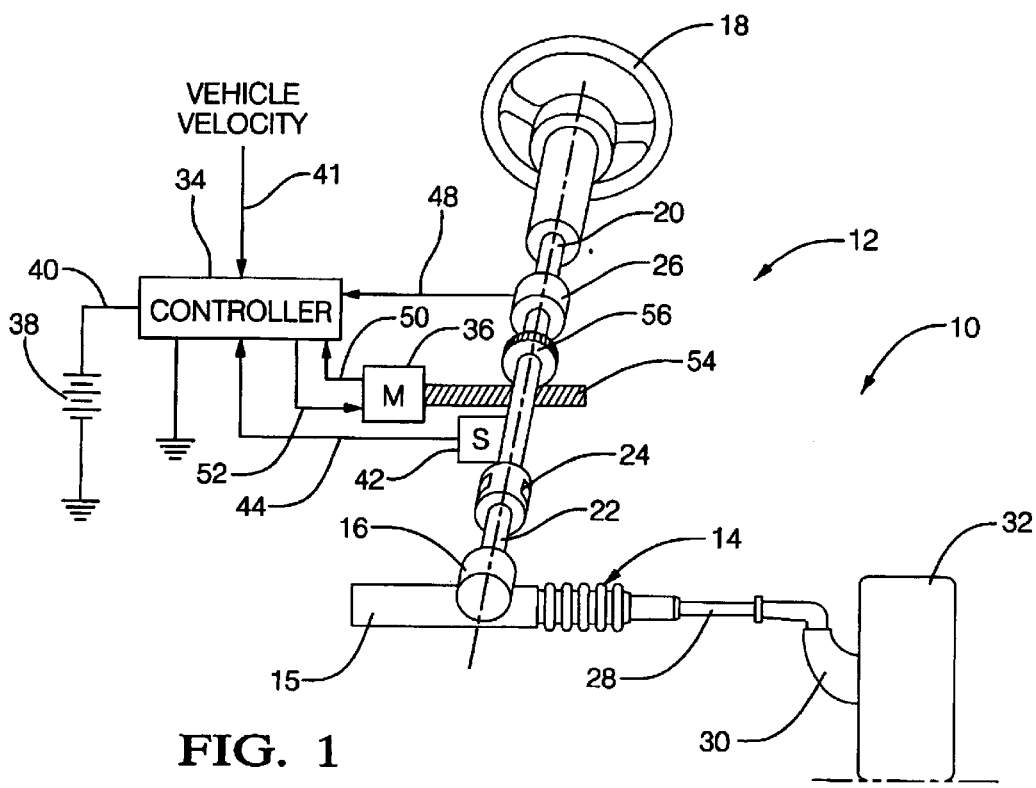
FIG. 1 is a schematic diagram of an electric power steering system using a polyphase brushless motor having rotor magnets in accordance with an embodiment of the invention.

Referring initially to FIG. 1, a motor vehicle 10 is provided with an electric power steering system 12. Electric power steering system 12 may include a conventional rack and pinion steering mechanism 14 having a toothed rack 15 and a pinion gear (not shown) under a gear housing 16. As steering wheel 18 is turned, an upper steering shaft 20 turns a lower shaft 22 through a universal joint 24. Lower steering shaft 22 turns the pinion gear. The rotation of the pinion gear moves the pinion rack 15, which then moves tie rods 28 (only one shown). In turn, tie rods 28 move steering knuckles 30 (only one shown) to turn wheels 32.

An electric power assist is provided through a controller 34 and a power assist actuator comprising a motor 36. Controller 34 receives electric power from a vehicle electric power source 38 through a line 40. The controller 34 also receives a signal representative of the vehicle velocity on line 41, as well as steering pinion gear angle from a rotational position sensor 42 on line 44. As steering wheel 18 is turned, a torque sensor 46 senses the torque applied to steering wheel 18 by the vehicle operator and provides an operator torque signal to controller 34 on line 48. In addition, as the rotor of motor 36 turns, rotor position signals for each phase are generated within motor 36 and provided over bus 50 to controller 34. In response to vehicle velocity, operator torque, steering pinion gear angle and rotor position signals received, the controller 34 derives desired motor phase currents. The motor phase currents are provided to motor 36 through a bus 52 to motor 36, which thereby provides torque assist to steering shaft 20 through worm 54 and worm gear 56.

Figure 2:
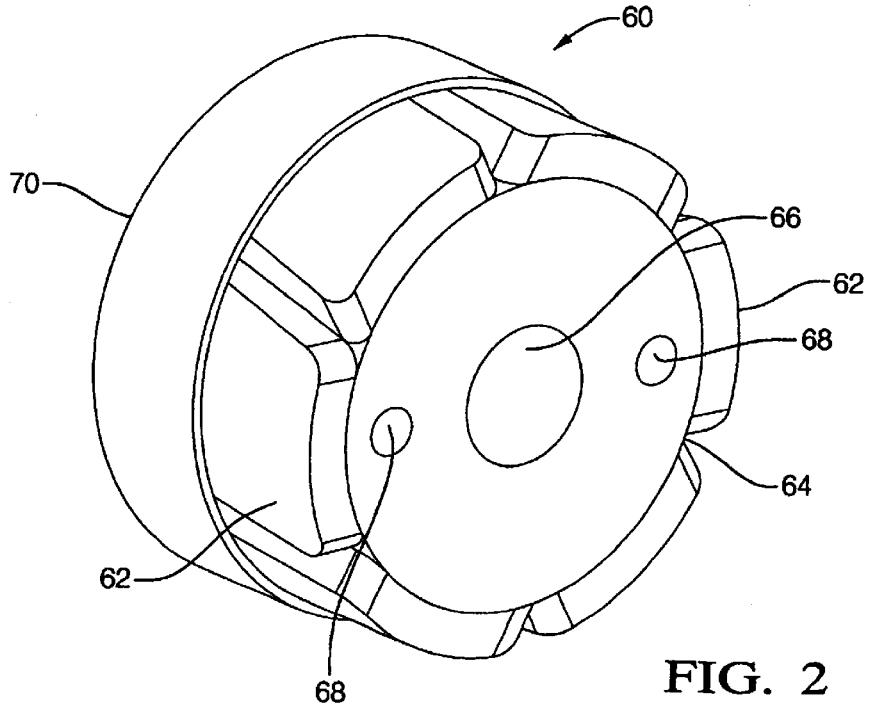
FIG. 2 is a perspective view of a partial rotor assembly of a motor, partially illustrating a plurality of rotor magnets mounted thereon, in accordance with an embodiment of the invention.
Figure 3:
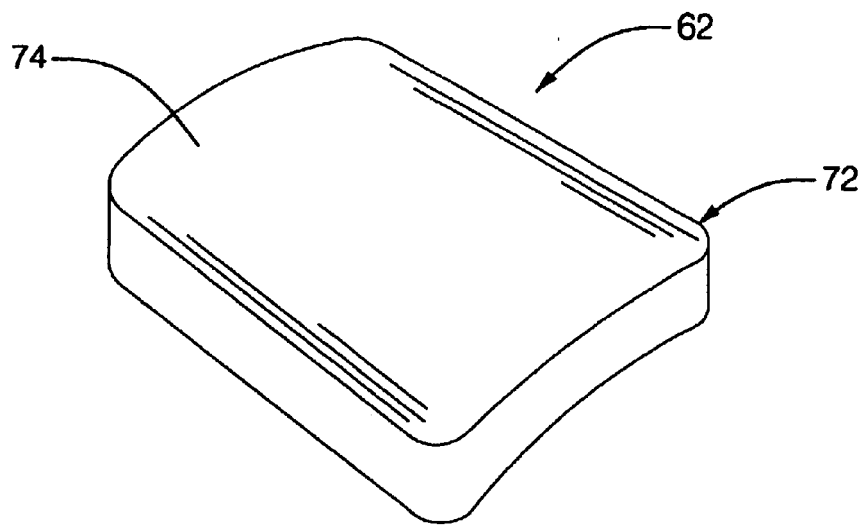
FIG. 3 is a perspective view of one of the rotor magnets shown in FIG. 2.
Figure 4:
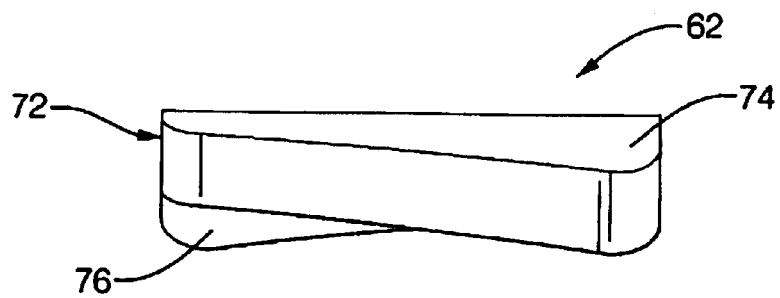
FIG. 4 is a side view of the magnet shown in FIG. 3.

Referring now to FIG. 2, motor 36 features a rotor assembly 60, which has a plurality of rotor magnets 62 circumferentially mounted upon a core 64. Core 64 is preferably circular in shape and may comprise a plurality of lamina of iron, steel or other magnetic material. A central hole 66 is centrally formed within the core 64 for receiving a rotor shaft (not shown) therewithin. A pair of positioning holes 68 is disposed on opposite sides of central hole 66 for properly positioning the magnets 62 on the periphery of core 64. A retention sleeve 70, shown partially cut away in FIG. 2, surrounds the rotor magnets 62 for retaining the magnets therewithin during rotation of the rotor assembly 60 and is made of a non-magnetic material such as stainless steel.

Figure 5:
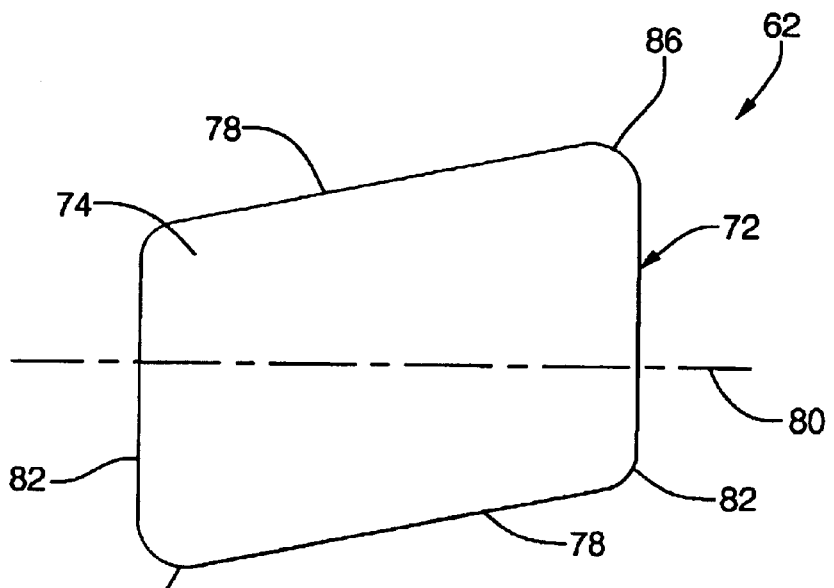
FIG. 5 is a top view of the magnet shown in FIG. 3.
Figure 6:
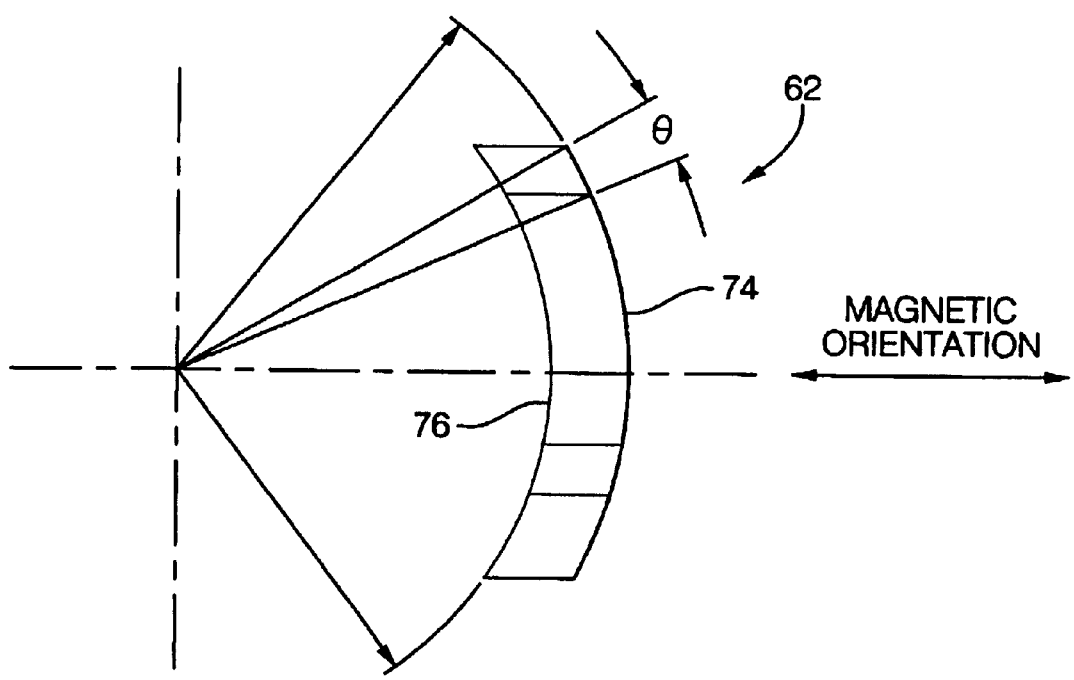
FIG. 6 is an end view of the magnet shown in FIG. 3.

FIGS. 3 through 6 illustrate a permanent magnet structure for an individual rotor magnet 62, in accordance with an embodiment of the invention. Each magnet 62 comprises a parallelogram shaped body 72 (as best seen in FIG. 5), having an arcuate outer surface 74 and an arcuate inner surface 76. FIG. 6 particularly illustrates outer and inner surfaces 74, 76, which are also generally concentric with one another.

Referring to FIGS. 5 and 6, it will be seen that the parallelogram shape of each of the magnets 62 provides skewed magnetic poles on rotor assembly 60. Body 72 has a pair of opposing side edges 78 that are parallel with one another, but which also form a skew angle with respect to the rotational axis 80 of rotor assembly 60. The skew angle is generally defined as 360°/n, where n represents the number of slots in the stator assembly (not shown). In the embodiment shown, each magnet 62 is designed for a motor 36 having 27 slots. Thus, the skew angle of each magnet 62 shown is approximately 360°/27, or 13.33°. Naturally, if magnets 62 were to be used in conjunction with a motor having a different number of slots, the skew angle would vary accordingly.

Referring again to FIG. 5, opposing end edges 82 are parallel to one another and are perpendicular to the rotational axis 80 of rotor assembly 60. Thus configured, magnet 62 has a leading corner 84 and a trailing corner 86 with respect to the direction of rotation of the rotor assembly 60 (or leading corner 86 and trailing corner 84 if the direction is reversed).

In a preferred embodiment, magnets 62 are comprised of a rare earth-based permanent magnet material such as neodymium-iron-boron, with each individual magnet 62 is also preferably epoxy coated, nickel-plated or aluminum deposition coated for corrosion protection.

By using the permanent magnet structure for an individual rotor magnet as described above, it has been found that the magnitude of the $5^{th}$ & $7^{th}$ harmonic components are reduced to less than 0.3% and 0.1% of the fundamental frequency component, respectively. Furthermore, it has also been found that the resulting cogging torque has been significantly reduced, having a value of approximately 0.002 Newton-meters (N·m).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A permanent magnet structure for use in brushless motors, the magnet structure comprising:
   a parallelogram shaped body;
   said body having an outer surface and an inner surface; and
   said outer surface and said inner surface being arcuate in shape.

2. The permanent magnet structure of claim 1, wherein said outer surface and said inner surface are generally concentric with one another.

3. The permanent magnet structure of claim 1, wherein said body is further comprised of neodymium-iron-boron material.

4. The permanent magnet structure of claim 3, wherein said body is epoxy coated.

5. The permanent magnet structure of claim 3, wherein said body nickel-plated.

6. The permanent magnet structure of claim 3, wherein said body is aluminum deposition coated.

7. A rotor assembly for a brushless motor, the rotor assembly comprising:
   a core having a central opening for insertion of a rotor shaft therein; and
   a plurality of rotor magnets, circumferentially mountable upon said core, each of said plurality of rotor magnets further comprising:
      a parallelogram shaped body, said body having an outer surface and an inner surface, said outer surface and said inner surface being arcuate in shape.

8. The rotor assembly of claim 7, wherein said outer surface and said inner surface are generally concentric with one another.

9. The rotor assembly of claim 7, wherein each of said plurality of rotor magnets is comprised of neodymium-iron-boron material.

10. The rotor assembly of claim 9, wherein each of said plurality of rotor magnets is epoxy coated.

11. The rotor assembly of claim 9, wherein each of said plurality of rotor magnets is nickel-plated.

12. The rotor assembly of claim 9, wherein each of said plurality of rotor magnets is aluminum deposition coated.

13. The rotor assembly of claim 7, further comprising a retention sleeve, disposed upon said outer surface of said plurality of rotor magnets.

14. A power assist actuator for an electric power steering system, the actuator comprising:
   a brushless motor coupled to a steering shaft and providing an assist torque thereon, said motor further including a rotor assembly, said rotor assembly further comprising:
      a core having a central opening for insertion of a rotor shaft therein; and
      a plurality of rotor magnets, circumferentially mountable upon said core, each of said plurality of rotor magnets further comprising:
         a parallelogram shaped body, said body having an outer surface and an inner surface, said outer surface and said inner surface being arcuate in shape.

15. The power assist actuator of claim 14, wherein said outer surface and said inner surface are generally concentric with one another.

16. The power assist actuator of claim 14, wherein each of said plurality of rotor magnets is comprised of neodymium-iron-boron material.

17. The power assist actuator of claim 16, wherein each of said plurality of rotor magnets is epoxy coated.

18. The power assist actuator of claim 16, wherein each of said plurality of rotor magnets is nickel-plated.

19. The power assist actuator of claim 16, wherein each of said plurality of rotor magnets is aluminum deposition coated.

20. The power assist actuator of claim 14, further comprising a retention sleeve, disposed upon said outer surface of said plurality of rotor magnets.

* * * * *